(12) United States Patent
Cui et al.

(10) Patent No.: US 12,173,812 B2
(45) Date of Patent: Dec. 24, 2024

(54) DIAPHRAGM VALVE BONNET, STRAIGHT THROUGH DIAPHRAGM VALVE, AND FLUID CONTROL SYSTEM

(71) Applicant: NINGJIN APC INDUSTRIES INCORPORATED COMPANY, Dezhou (CN)

(72) Inventors: Shusheng Cui, Dezhou (CN); Liyong Zhang, Dezhou (CN)

(73) Assignee: NINGJIN APC INDUSTRIES INCORPORATED COMPANY, Dezhou (CN)

( * ) Notice: Subject to any disclaimer, the term of this patent is extended or adjusted under 35 U.S.C. 154(b) by 0 days.

(21) Appl. No.: 17/928,921

(22) PCT Filed: Oct. 9, 2021

(86) PCT No.: PCT/CN2021/122811
§ 371 (c)(1),
(2) Date: Nov. 30, 2022

(87) PCT Pub. No.: WO2022/262153
PCT Pub. Date: Dec. 22, 2022

(65) Prior Publication Data
US 2024/0218934 A1    Jul. 4, 2024

(51) Int. Cl.
*F16K 7/17* (2006.01)
*F16K 27/02* (2006.01)

(52) U.S. Cl.
CPC .......... *F16K 7/17* (2013.01); *F16K 27/0236* (2013.01)

(58) Field of Classification Search
CPC ... F16K 7/123; F16K 7/17; F16K 7/20; F16K 15/145; F16K 31/126
See application file for complete search history.

(56) References Cited

U.S. PATENT DOCUMENTS 3,182,684 A * 5/1965 Hutchison ........... F16K 31/1266
                                                   92/48
5,383,646 A    1/1995 Weingarten
(Continued)

FOREIGN PATENT DOCUMENTS

CN         1414272 A     4/2003
CN       105257862 A     1/2016
(Continued)

OTHER PUBLICATIONS

Machine English translation of WO2010/012425 (Year: 2024).*
International Search Report, PCT/CN2021/122811, Jul. 13, 2022, 5 pages.

*Primary Examiner* — Hailey K. Do

(57) ABSTRACT

A guide protrusion arranged on a bonnet body of a diaphragm valve bonnet can guide movement of a diaphragm during opening or resetting. A straight through diaphragm valve includes the diaphragm valve bonnet. A fluid control system includes the straight through diaphragm valve. Connecting a control cavity of the fluid control system to a second external pipeline forms a fluid channel at a bonnet end; connecting a fluid cavity thereof to a first external pipeline forms a fluid channel at a valve body end. By regulating pressures of the fluids in the fluid channel at the bonnet end and the fluid channel in the valve body end, the diaphragm can move in the direction close to the bonnet along the guide protrusion to open the fluid cavity, or the diaphragm can reset in the direction far away from the bonnet along the guide protrusion to seal the fluid cavity.

14 Claims, 8 Drawing Sheets

(56) References Cited

U.S. PATENT DOCUMENTS

| | | | | |
|---|---|---|---|---|
| 7,938,142 B2* | 5/2011 | Migliorati | ............ | B65D 88/703 |
| | | | | 251/61.1 |
| 8,973,891 B2* | 3/2015 | Maeda | ................ | F16K 31/1266 |
| | | | | 137/907 |
| 2014/0166130 A1* | 6/2014 | Jin | ................... | F02M 35/10236 |
| | | | | 137/488 |
| 2017/0114923 A1 | 4/2017 | Chu et al. | | |

FOREIGN PATENT DOCUMENTS

| | | | | |
|---|---|---|---|---|
| CN | 212564506 U | 2/2021 | | |
| WO | WO-2010012425 A1 * | 2/2010 | .............. | F16K 7/17 |

* cited by examiner

DIAPHRAGM VALVE BONNET, STRAIGHT THROUGH DIAPHRAGM VALVE, AND FLUID CONTROL SYSTEM

CROSS-REFERENCE TO RELATED APPLICATION

This application is a national stage of International Application No. PCT/CN2021/122811, filed on Oct. 9, 2021, which is hereby incorporated by reference in its entirety.

TECHNICAL FIELD

The present disclosure belongs to the technical field of valves, and relates to a main valve structure, particularly to a diaphragm valve bonnet, a straight through diaphragm valve, and a fluid control system.

BACKGROUND

At present, a main valve of a fluid control system in the market is limited by a design principle, and has the main disadvantages that the bearing pressure is low, the flow loss is great, and individual accessories are high in manufacturing cost and difficult to manufacture. Some valves are also limited by mounting directions. Taking deluge valves as an example, there are mainly two types of deluge valves in the market.

(1) Deluge valves of diaphragm type are provided. A diaphragm achieves the effects of bearing pressure and sealing. The disadvantages are that the flow loss is great, it is high in diaphragm manufacturing cost and manufacturing difficulty, and the pressure for usage is limited. In addition, opening and closing of the diaphragm is controlled by fluid, and the diaphragm is easily overturned and displaced during opening or closing, thereby affecting pressure bearing and sealing effects of the diaphragm.

(2) Deluge valves of lever type are provided. Deluge valves of such kind have the disadvantages that they can only be mounted vertically, there are many accessories, and the machining cost is high.

SUMMARY

One of the objectives of the present disclosure is to provide a bonnet with a diaphragm guide function, which is mainly used for a diaphragm valve to solve the problem in the prior art that a diaphragm is easily overturned and displaced during opening and closing. In order to achieve the objective, the present disclosure provides the following solution.

It is provided a diaphragm valve bonnet, including:
a bonnet body, where the bonnet body is configured for connecting a valve body; and
a guide protrusion, where the guide protrusion is formed on an end face, configured for matching with the valve body, of the bonnet body, so as to guide opening and closing of a diaphragm in the valve body.

Optionally, the guide protrusion is a conical protrusion; and a large end of the conical protrusion is connected to the bonnet body.

Another objective of the present disclosure is to provide a straight through diaphragm valve which has a diaphragm that is not easily overturned and displaced during opening or reset closing, and has the advantages of low flow loss, easiness in machining, high reliability, and the like. In order to achieve the objective, the present disclosure provides the following solution.

It is provided a straight through diaphragm valve, including:
a straight through valve body, where through holes for connecting a first external pipeline are formed in the straight through valve body;
a bonnet, where the bonnet is connected to the straight through valve body, and through holes for connecting a second external pipeline are formed in the bonnet;
a diaphragm, where the diaphragm is arranged in the straight through valve body, and fixed between the bonnet and the straight through valve body; a control cavity is formed between the diaphragm and the bonnet, and a fluid cavity is formed between the diaphragm and the straight through valve body; and
a guide protrusion, where the guide protrusion is formed on an end face, configured for matching with the straight through valve body, of the bonnet, so as to guide opening and closing of the diaphragm.

Optionally, the diaphragm includes:
a sealing section, where the sealing section is configured for sealing the fluid cavity, and a diaphragm skeleton is wrapped in the sealing section so that the sealing section is kept in a fixed shape; and
a connecting section, where the connecting section is connected to an end of the sealing section, and fixed between the bonnet and the straight through valve body.

Optionally, the diaphragm skeleton is a conical skeleton, namely in a shape of frustum, so that the sealing section is a conical sealing section: and the connecting section is connected to a large end of the conical sealing section.

Optionally, the guide protrusion is a conical protrusion, and a large end of the conical protrusion is connected to the bonnet.

Optionally, a taper of the conical protrusion is equal to that of the diaphragm skeleton.

Optionally, a diaphragm of the sealing section extends to form the connecting section.

Optionally, the diaphragm of the sealing section completely wraps the diaphragm skeleton therein and extends to form the connecting section.

Optionally, the diaphragm, i.e. the sealing section and the connecting section, is in a shape of a cone.

Optionally, a conical sealing surface of the valve body is formed in the fluid cavity, so as to seal and fit an outer peripheral surface of the conical sealing section when the diaphragm is reset and closed. A closed state of the diaphragm is configured as an original state, a process of switching the diaphragm from an opened state to the closed state is a resetting (or reset closing) process of the diaphragm.

Optionally, a conical concave surface is formed in the fluid cavity, so as to be embedded into a bottom of the conical sealing section to form a sealing pair when the diaphragm is reset and closed. A closed state of the diaphragm is configured as an original state, a process of switching the diaphragm from an opened state to the closed state is a resetting (or reset closing) process of the diaphragm.

Optionally, hollow holes communicated with the second external pipeline are formed in the guide protrusion.

Optionally, the guide protrusion is located at a center of the bonnet. Through holes used for connecting the second external pipeline are at least formed in an end face, covered by the guide protrusion, of the bonnet. The through holes formed in the end face, covered by the guide protrusion, of the bonnet are communicated with the control cavity through the hollow holes.

Optionally, the guide protrusion and the bonnet are integrally formed.

Optionally, the bonnet, the diaphragm, and the straight through valve body are detachably connected with one another by bolts.

Optionally, the through holes in the bonnet that are connected to the second external pipeline and/or the through holes in the straight through valve body that are connected to the first external pipeline are threaded holes.

Optionally, the first external pipeline and the second external pipeline are connected to a same fluid pipeline or different pipelines. Both the first external pipeline and the second external pipeline are non-specific pipelines. Different pipelines are applied in different scenarios.

Optionally, the diaphragm is a rubber diaphragm, such as EPDM (Ethylene-Propylene-Diene Monomer), or NBR (Nitrile Butadiene Rubber).

Optionally, the diaphragm skeleton is a ductile cast iron skeleton or a stainless steel skeleton.

Optionally, connecting flanges are respectively arranged at two ends of the straight through valve body, so as to realize the connection between the straight through diaphragm valve and the pipeline.

The present disclosure further provides a fluid control system, which includes the straight through diaphragm valve as described above. The control cavity is connected to the second external pipeline to form a first fluid channel at a bonnet end. The fluid cavity is connected to the first external pipeline to form a second fluid channel at a valve body end. By regulating and controlling a pressure of the fluid in the first fluid channel at the bonnet end and a pressure of the fluid in the second fluid channel at the valve body end, the diaphragm can move in a direction close to the bonnet along the guide protrusion to open the fluid cavity, or the diaphragm can reset in a direction far away from the bonnet along the guide protrusion to seal the fluid cavity. A closed state of the diaphragm is configured as an original state, so a process of switching the diaphragm from an opened state to the closed state is a resetting (or reset closing) process of the diaphragm.

Compared with the prior art, the present disclosure achieves following technical effects.

According to the diaphragm valve bonnet provided by the present disclosure, the guide protrusion is arranged on the bonnet body, which can guide movement of the diaphragm during opening or closing of the diaphragm, thereby preventing the diaphragm from overturning and displacing.

The straight through diaphragm valve provided by the present disclosure is different from the existing diaphragm valve structure on the market, has a simple and reasonable structure, is easy to machine, low in manufacturing cost, and convenient to maintain. A straight through valve body structure of the present disclosure has low flow loss, which can improve the service life of a diaphragm valve. The guide protrusion on the bonnet functions to guide during opening and closing of the diaphragm, and prevents the diaphragm from overturning and replacing, which is beneficial to further improving the stability and the sealing property of the diaphragm. The straight through diaphragm valve may serve as a main valve structure, and is suitable for an automatic sprinkler system and a fluid control system with high pressure.

Due to the adoption of the abovementioned straight through diaphragm valve, the fluid control system provided by the present disclosure has the technical advantages corresponding to the abovementioned straight through diaphragm valve. The fluid control system may be an automatic sprinkler system, a drainage system, etc.

BRIEF DESCRIPTION OF THE DRAWINGS

To describe the technical solutions in the embodiments of the present disclosure or in the prior art more clearly, the following briefly describes the drawings for the embodiments. Apparently, the drawings in the following description are merely some embodiments of the present disclosure, and those of ordinary skill in the art may still derive other drawings from these drawings without creative efforts.

Figure 1:
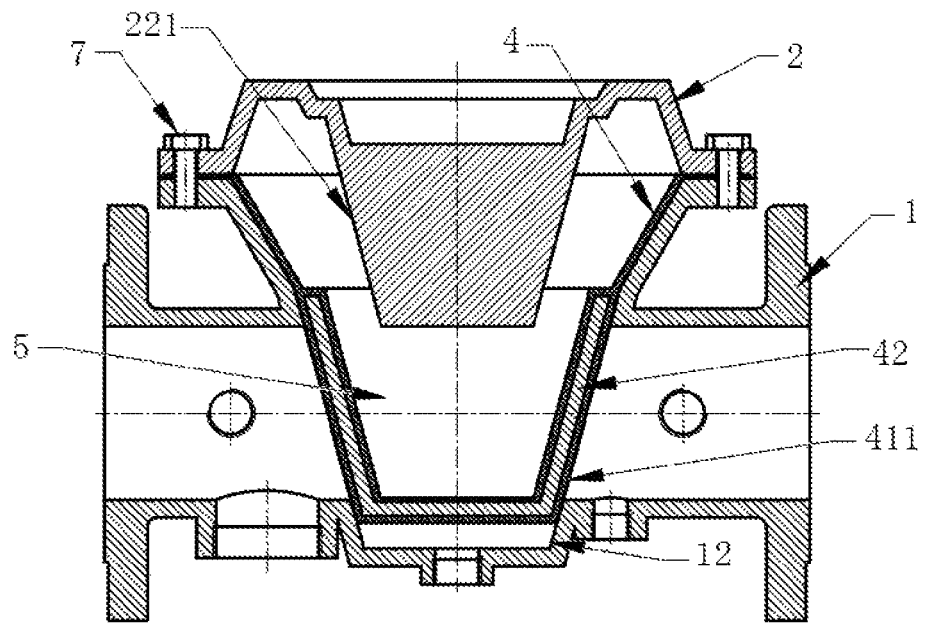
FIG. 1 is a schematic structural diagram of a straight through diaphragm valve in a closed state according to an embodiment of the present disclosure.

REFERENCE NUMERALS 100 straight through diaphragm valve;
1 straight through valve body; 11 conical sealing surface of valve body; 12 conical concave surface;
2 bonnet; 21 bonnet body; 22 guide protrusion; 221 conical surface of bonnet; 222 hollow hole;
3 through hole;
4 diaphragm; 41 sealing section; 411 conical sealing surface of diaphragm; 42 diaphragm skeleton; 43 connecting section;
5 control cavity;
6 fluid cavity; 61 upper cavity; 62 lower cavity;

7 bolt;
8 connecting flange;
9 drainage hole;
200 drainage loop; 300 alarm loop; 400 alarm test loop; 500 release loop; 600 water injection loop; 700 automatic drainage loop; and 800 pilot valve.

DETAILED DESCRIPTION OF THE EMBODIMENTS

Technical solutions in the embodiments of the present disclosure will be clearly and completely described below with reference to the drawings in the embodiments of the present disclosure. Apparently, the described embodiments are merely part rather than all of the embodiments of the present disclosure. Upon the embodiments of the present disclosure, all other embodiments obtained by those of ordinary skill in the art without creative efforts may fall within the scope of protection of the present disclosure.

One of the objectives of the present disclosure is to provide a bonnet with a diaphragm guide function, which is mainly used for a diaphragm valve to solve the problem in the prior art that a diaphragm is easily overturned and displaced during opening and closing.

Another objective of the present disclosure is to provide a straight through diaphragm valve which has a diaphragm that is not easily overturned and displaced during opening or reset closing, and has the advantages of low flow loss, easiness in machining, high reliability, and the like, so as to solve the problems of great flow loss and high manufacturing cost in the existing valve.

Yet another objective of the present disclosure is to provide a fluid control system including the abovementioned straight through diaphragm valve.

In order to make the abovementioned objectives, features, and advantages of the present disclosure more apparent and more comprehensible, the present disclosure is further described in detail below with reference to the drawings and specific embodiments.

Embodiment 1

As shown in FIG. 8 to FIG. 11, a bonnet 2 for a diaphragm valve is provided, which mainly includes a bonnet body 21 and a guide protrusion 22. The bonnet body 21 is connected to a valve body. The guide protrusion 22 is arranged on an end surface, used for matching with the valve body, of the bonnet body 21, so as to guide opening and closing actions of the diaphragm in the valve body.

As a preferred mode, in the present embodiment, the guide protrusion 22 is configured as a conical protrusion, and a large end of the conical protrusion is connected to the bonnet body 21. In general, the diaphragm moves in the direction close to the bonnet body 21 to open the valve. On the contrary, the valve is closed. A small end of the guide protrusion 22 is provided away from the bonnet body 21. When the valve is closed, a small end of the guide protrusion 22 enables the diaphragm to smoothly slide off the guide protrusion 22 while the diaphragm is moved along the guide protrusion 22. Correspondingly, when the valve is opened, the diaphragm is moved from the small end to the large end of the guide protrusion 22, thereby having good guidance so that the diaphragm can be effectively prevented from overturning and displacing during opening.

Embodiment 2

As shown in FIG. 1 to FIG. 13, the present embodiment provides a straight through diaphragm valve 100 which has a diaphragm that is not easily overturned and displaced during opening or reset closing, and has the advantages of low flow loss, easiness in machining, high reliability, and the like. The straight through diaphragm valve 100 mainly includes a straight through valve body 1, the bonnet 2, a diaphragm 4, and the guide protrusion 22. Through holes 3 connected to a first external pipeline are formed in the straight through valve body 1. The bonnet 2 is connected to the straight through valve body 1. Through holes 3 connected to a second external pipeline are formed in the bonnet 2. The diaphragm 4 is arranged in the straight through valve body 1 and fixed between the bonnet 2 and the straight through valve body 1. A control cavity 5 is formed between the diaphragm 4 and the bonnet 2. A fluid cavity 6 is formed between the diaphragm 4 and the valve body. The guide protrusion 22 is formed on an end face, used for matching with the straight through valve body 1, of the bonnet 2, so as to guide opening and closing of the diaphragm 4.

In the present embodiment, as shown in FIG. 1, FIG. 2, FIG. 12, and FIG. 13, the diaphragm 4 includes a sealing section 41 and a connecting section 43. The sealing section 41 is used for sealing the fluid cavity 6, and a diaphragm skeleton 42 is wrapped in the sealing section 41. The diaphragm skeleton 42 can keep the sealing section 41 in a fixed shape. The connecting section 43 is connected to an end of the sealing section 41, and is fixed between the bonnet 2 and the straight through valve body 1.

Figure 2:
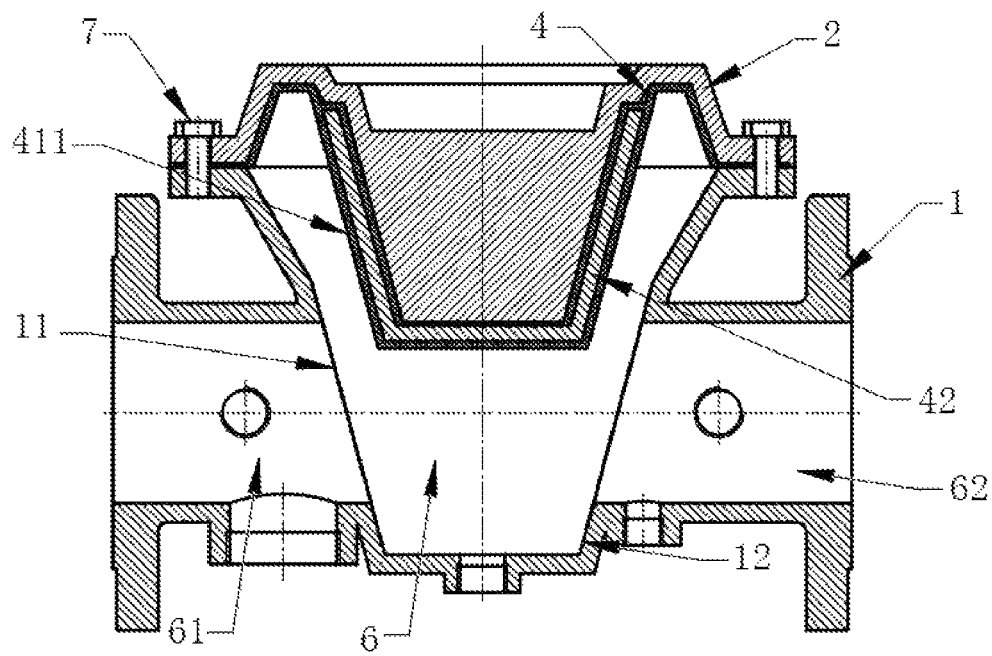
FIG. 2 is a schematic structural diagram of the straight through diaphragm valve in an opened state according to an embodiment of the present disclosure.
Figure 3:
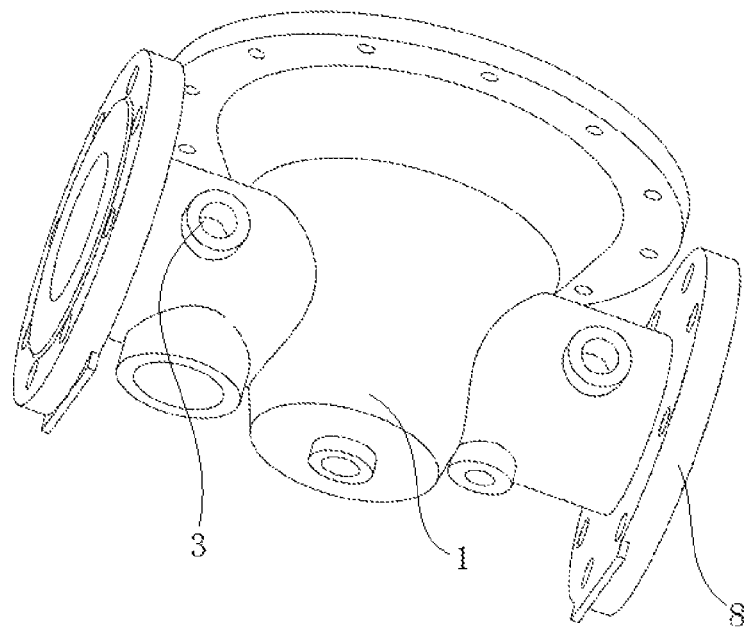
FIG. 3 is a schematic structural diagram of a straight through valve body according to an embodiment of the present disclosure.
Figure 4:
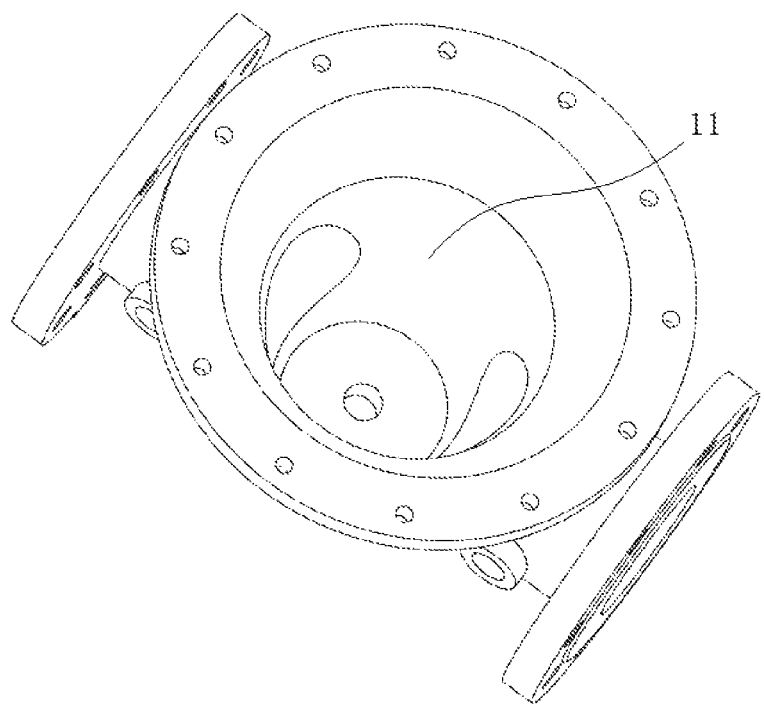
FIG. 4 is a top view of the straight through valve body according to an embodiment of the present disclosure.
Figure 5:
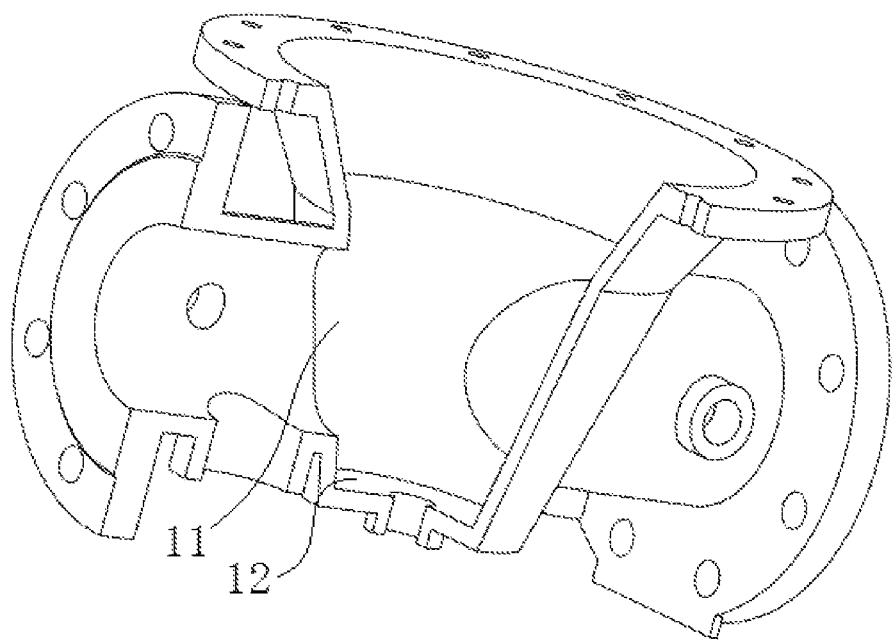
FIG. 5 is a 90° sectional view of the straight through valve body according to an embodiment of the present disclosure.
Figure 6:
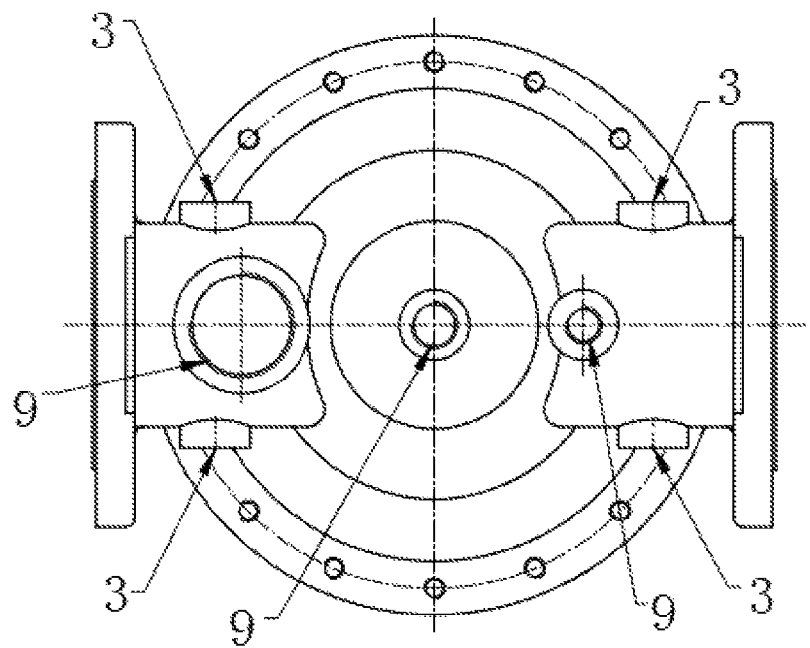
FIG. 6 is a bottom view of the straight through valve body according to an embodiment of the present disclosure.
Figure 7:
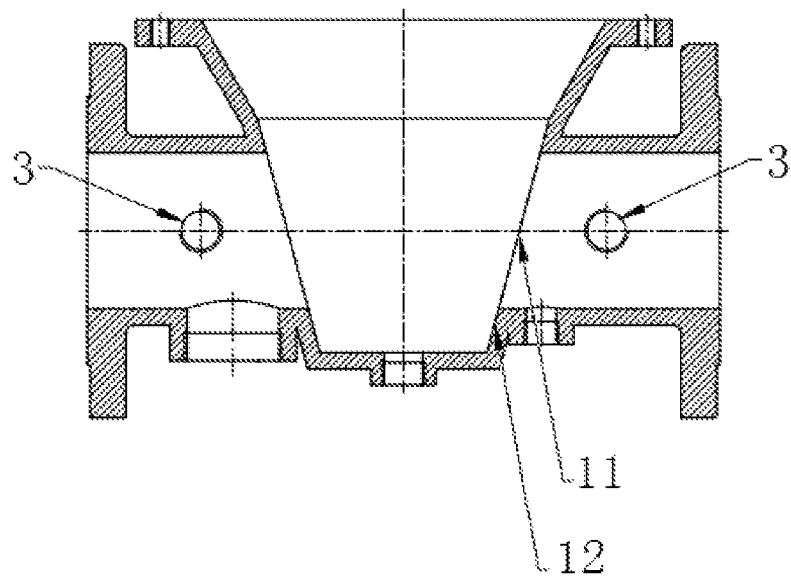
FIG. 7 is a longitudinal sectional view of the straight through diaphragm valve body according to an embodiment of the present disclosure.
Figure 12:
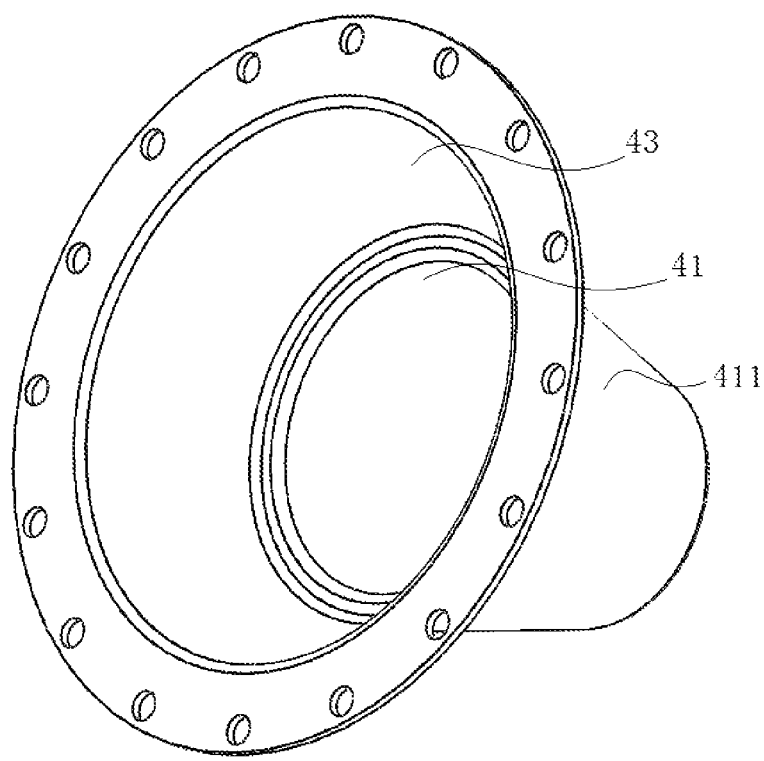
FIG. 12 is a first axonometric drawing of a diaphragm according to an embodiment of the present disclosure.
Figure 13:
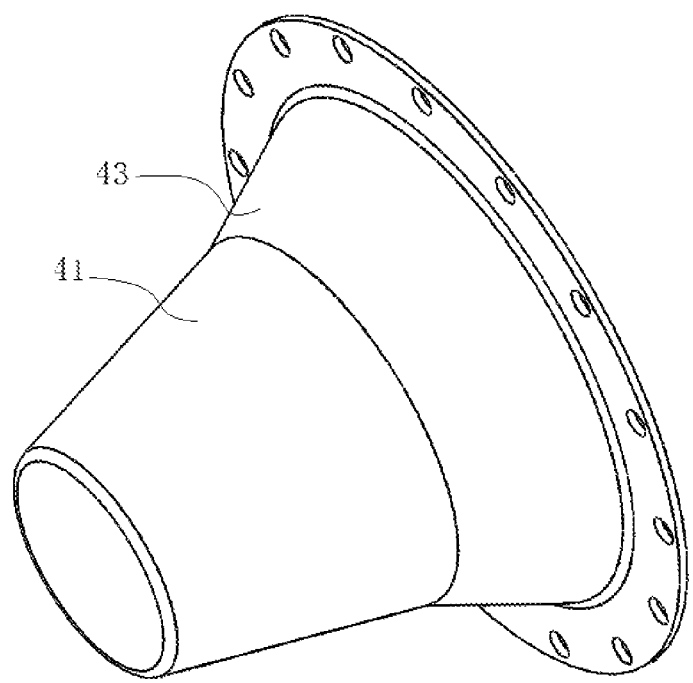
FIG. 13 is a second axonometric drawing of the diaphragm according to an embodiment of the present disclosure.

In the present embodiment, as shown in FIG. 1, FIG. 2. FIG. 12, and FIG. 13, the diaphragm skeleton 42 is preferably a conical skeleton, that is, the overall diaphragm skeleton 42 is in a shape of a frustum, so that the sealing section 41 is a conical sealing section. The connecting section 43 is connected to a large end of the conical sealing section, and is formed by direct extension of the diaphragm 4 of the sealing section 41. The diaphragm of the sealing section 41 completely wraps the diaphragm skeleton 42 therein, so that the sealing section 41 has a double-layer diaphragm structure. The connecting section 43 can be stacked on the guide protrusion 22 when the sealing section 41 is reset along the guide protrusion 22 (that is, when the valve is opened). When the sealing section 41 is completely sleeved on the guide projection 22, and the sealing section 41 cannot continue to move along the guide projection 22 (at this moment, the valve is in a fully opened state), the connecting section 43 can fully fit with a corner formed between the guide projection 22 and the bonnet 2. At this moment, the diaphragm of the connecting section 43 is kept or basically kept in a flat state, as shown in FIG. 2. The diaphragm 4 is preferably a diaphragm made of a rubber material, such as EPDM (Ethylene-Propylene-Diene Monomer) and NBR (Nitrile Butadiene Rubber). The diaphragm skeleton 42 is preferably made of ductile cast iron or stainless steel.

Figure 8:
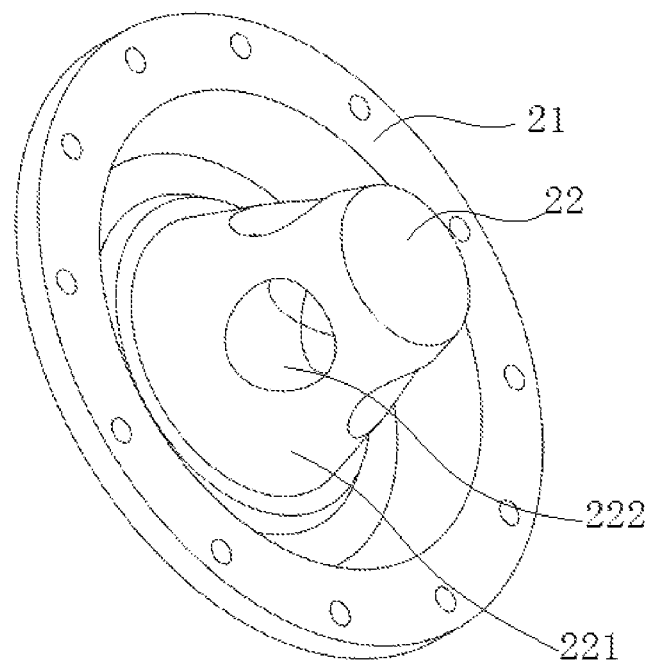
FIG. 8 is a first axonometric drawing of a bonnet according to an embodiment of the present disclosure.
Figure 9:
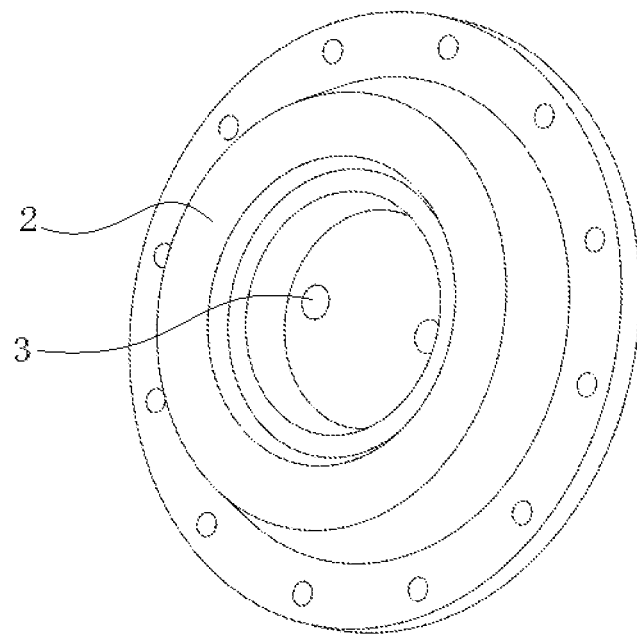
FIG. 9 is a second axonometric drawing of the bonnet according to an embodiment of the present disclosure.
Figure 10:
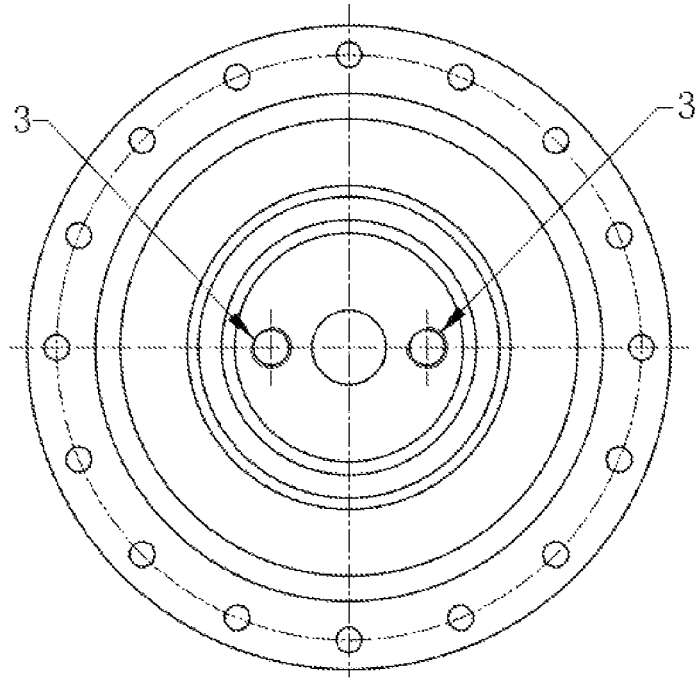
FIG. 10 is a top view of the bonnet according to an embodiment of the present disclosure.
Figure 11:
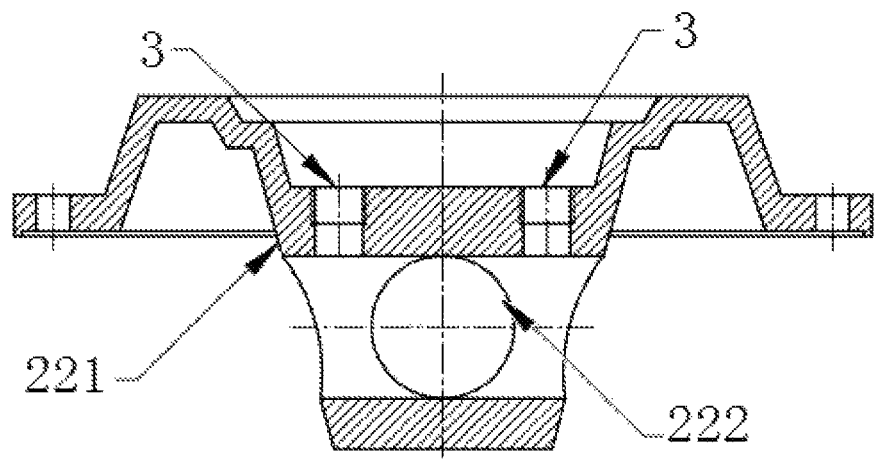
FIG. 11 is a longitudinal sectional view of the bonnet according to an embodiment of the present disclosure.

In the present embodiment, as shown in FIG. 1. FIG. 2, FIG. 8, and FIG. 11, considering the adaptation to the shape of the sealing section 41, the guide protrusion 22 is designed as a conical protrusion, and a large end of the conical protrusion is connected to the bonnet 2. As a preferred mode, a taper of the conical protrusion (that is, the guide protrusion 22) is equal to that of the conical skeleton (that is, the diaphragm skeleton 42).

In the present embodiment, as shown in FIG. 1 to FIG. 7, a conical sealing surface 11 of the valve body is formed in the fluid cavity 6 of the straight through valve body 1, so as to seal and fit an outer peripheral surface of the conical sealing section, that is, a conical sealing surface 411 of the diaphragm, to form a sealing pair when the diaphragm 4 is closed (reset). In the present embodiment, the valve is opened or closed by using good self-sealing property of a cone structure, which can effectively ensure the sealing performance when the valve is closed. It is to be noted that the closed (also referred to as reset closed or reset) state of the diaphragm in the document of the present application means that the fluid cavity is in a closed state, or the straight through diaphragm valve is in a closed state.

In the present embodiment, as shown in FIG. 1 and FIG. 2, a conical concave surface 12 is formed in the fluid cavity 6 of the straight through valve body 1, so as to be embedded into the bottom of the conical sealing section to form a sealing pair when the diaphragm 4 is in a closed (reset) state, which can prevent the bottom of the diaphragm 4 from shaking: cooperating with a supporting function of the diaphragm skeleton 42 in the diaphragm 4, it is beneficial to improve the sealing effect of the diaphragm 4, thereby prolonging service life of the diaphragm and the overall valve.

In the embodiment, as shown in FIG. 8 and FIG. 11, hollow holes 222 communicated with a second external pipeline are formed in the guide protrusion 22. As a preferred mode, in the present embodiment, the guide protrusion 22 is located at a center of the bonnet 2. Through holes 3 used for connecting the second external pipeline are at least formed in an end face, covered by the guide protrusion 22, of the bonnet 2. The through holes 3 formed in the end face, covered by the guide protrusion 22, of the bonnet 2 are communicated with the control cavity 5 through the hollow holes 222.

In the present embodiment, the guide protrusion 22 and the bonnet 2 may be provided in one-piece, or may be provided separately and assembled with each other. As a preferred mode, the guide protrusion 22 and the bonnet 2 of the present embodiment are formed integrally.

In the present embodiment, as shown in FIG. 1 and FIG. 2, the bonnet 2, the diaphragm 4, and the straight through valve body 1 are detachably connected with one another by bolts 7.

In the present embodiment, the through holes 3 in the bonnet 2 and the through holes 3 in the straight through valve body 1 are preferably threaded holes, which can be directly threaded with the external pipeline, and are convenient to mount.

In the present embodiment, as shown in FIG. 1, connecting flanges 8 are respectively arranged at two ends of the straight through valve body 1, so as to mount and connect the straight through diaphragm valve 100 to a corresponding pipeline.

In the present embodiment, the first external pipeline connected to the through holes 3 in the straight through valve body 1 and the second external pipeline connected to the through holes 3 in the bonnet 2 are connected to the same fluid pipeline or different pipelines. The abovementioned first external pipeline and second external pipeline are non-specific pipelines. Different pipelines are applied in different scenarios.

In the present embodiment, a working principle of the straight through diaphragm valve 100 is that: when liquid enters from the through holes 3 in the bonnet 2, the diaphragm 4 is pushed to move in the direction far away from the bonnet 2 under the action of pressure, so that the conical sealing surface 411 of the diaphragm is in contact with the conical sealing surface 11 of the valve body to achieve a sealing effect, as shown in FIG. 1. At this moment, the diaphragm 4 tightly fits the straight through valve body 1, the bottom end of the diaphragm 4 is completely embedded into the conical concave surface 12, which can protect the diaphragm 4 from being damaged under a high pressure. A cavity formed between the bonnet 2 and the diaphragm 4 is a control cavity 5, and a cavity formed between the diaphragm 4 and the straight through valve body 1 is a fluid cavity 6. A cavity at a water inlet end of the valve body is a lower cavity 62, and a cavity at a water outlet end is an upper cavity 61. The upper cavity 61 and the lower cavity 62 also belong to the fluid cavity 6. The fluid cavity located between the upper cavity 61 and the lower cavity 62 is matched with the diaphragm 4, so that the communication (the valve is opened) and the cutoff (the valve is closed) between the upper cavity 61 and the lower cavity 62 is realized through the movement of the diaphragm 4. When the pressure in the control cavity 5 drops to a certain value, the fluid with pressure in the lower cavity 62 will push the diaphragm 4 to move to open the valve, that is, the upper cavity 61 is communicated with the lower cavity 62, and the diaphragm 4 cannot tilt and overturn due to the guiding effect when moving along the conical surface 221 of the bonnet, as shown in FIG. 2.

The present embodiment further provides a fluid control system, which includes the straight through diaphragm valve 100 as described above. The control cavity 5 is connected to the second external pipeline to form a fluid channel at a bonnet end. The fluid cavity 6 is connected to the first external pipeline to form a fluid channel at a valve body end. By regulating and controlling the pressure in the fluid channel at the bonnet end and the pressure in the fluid channel in the valve body end, the diaphragm 4 can move in the direction close to the bonnet 2 along the guide protrusion 22 to open the fluid cavity 6, or the diaphragm 4 can reset in the direction far away from the bonnet 2 along the guide protrusion 22 and slide off the guide protrusion 22, so as to seal the fluid cavity 6. Both the abovementioned first external pipeline and second external pipeline are non-specific pipelines. Different pipelines are applied in different scenarios. Taking a deluge alarm system as an example, the working principle of the fluid control system of the present embodiment is specifically described below.

Figure 14:
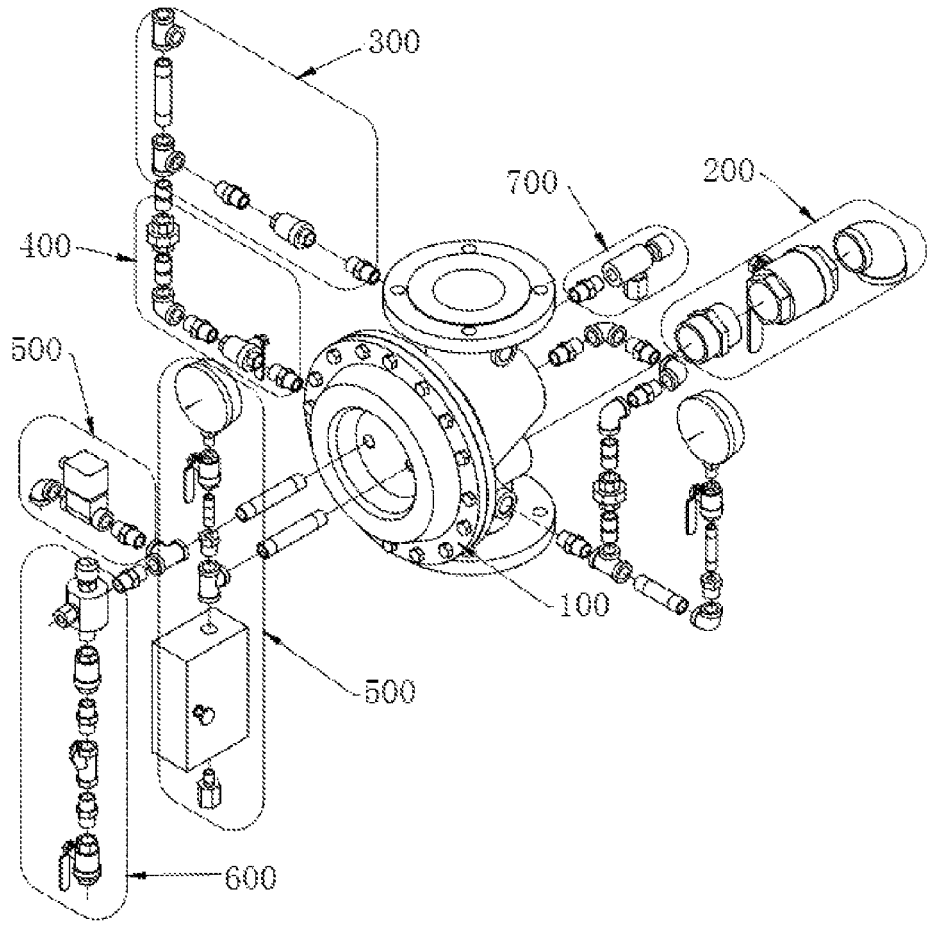
FIG. 14 is a schematic diagram showing pipelines installed in a spraying system in which the straight through diaphragm valve is used, according to an embodiment of the present disclosure.

As shown in FIG. 14, the deluge alarm system includes the straight through diaphragm valve 100, a drainage loop 200, an alarm loop 300, an alarm test loop 400, a release loop 500, a water injection loop 600, and an automatic drainage loop 700. The straight through diaphragm valve 100 serves as a deluge alarm valve. The drainage loop 200 is used for draining the water in the valve body and in the pipelines behind the valve out of the valve after the deluge alarm valve is used once and is reset. After drainage is completed, a drainage ball valve is closed (the drainage ball valve is normally closed, and is only opened during draining). When the deluge alarm valve acts, water enters an alarm bell, a pressure switch, or other alarm devices through the alarm loop 300. When the deluge alarm valve is in a standby state, the alarm test loop 400 is used for testing the reliability of the alarm system periodically. During testing, a ball valve on the loop is opened (the ball valve is only opened during testing), and water enters the alarm system from a water supply side of a valve plate, and the test ball valve is closed in time after the test is completed. The release loop 500 is connected to the control cavity 5, used for releasing a pressure therein, and can have an automatic release part and a manual emergency release part. The automatic release part can be externally connected to a solenoid valve, a pneumatic valve, etc. The water injection loop 600 is used for injecting water to the control cavity 5 to complete resetting of the valve (that is, the diaphragm is restored to a closed state); this loop must be connected to a water supply side of a water supply control valve in front of the valve. The automatic drainage loop 700 is used for draining when the valve is reset. The abovementioned deluge alarm system mainly includes the following two working modes:

(1) Start: when a fire disaster occurs, a fire disaster signal is transmitted to a control module, and the control module processes the signal and sends a start signal to a solenoid valve or other control valves on the release loop 500 of the deluge alarm valve. The solenoid valve or other control valves are opened, the control cavity 5 releases pressure, so that water enters a pipe network of the system from the water supply side after the deluge alarm valve is opened, and sprays to the overall protection area through nozzles, thereby executing a fire extinguishing function. When the solenoid valve or other control valves cannot be opened normally upon receiving the signal, a manual emergency release valve should be opened by a worker, so that a diaphragm cavity releases the pressure.

(2) Reset: after the fire is extinguished, the solenoid valve or other control valves on the release loop 500 are closed, the manual emergency release valve is closed, the water supply control valve in front of the valve is closed, and then the worker presses down a manual reset valve on the water injection loop 600 to inject water to the control cavity 5 quickly, and the deluge alarm valve is reset. The manual reset valve is pressed down until the water pressure of the control cavity 5 is equal to the water pressure of the water supply side, a one-way valve in the manual reset valve is automatically opened, and the water pressure of the control cavity 5 and the water pressure of the water supply side are kept consistent all the time. Finally, the water supply control valve in front of the valve is opened to complete resetting.

In the abovementioned deluge alarm system, the pressure of the control cavity 5 may be released electrically, pneumatically, manually or the like. The valve is automatically opened under the action of the pressure of the pipeline of the water supply system, and an alarm is given when water flows into a water spraying system automatically. The straight through diaphragm valve 100 of the present embodiment may be vertically mounted, or may be horizontally mounted, may also form a variety of deluge alarm fire extinguishing systems with other components, and is applicable to automatic sprinkler systems in residential buildings, hospitals, hotels, shopping malls, factories, airports, casinos, libraries, stadiums, convention and exhibition centers, etc. In general, the temperature in the application environment is not lower than 4° C., and not higher than 70° C.

Embodiment 3

Figure 15:
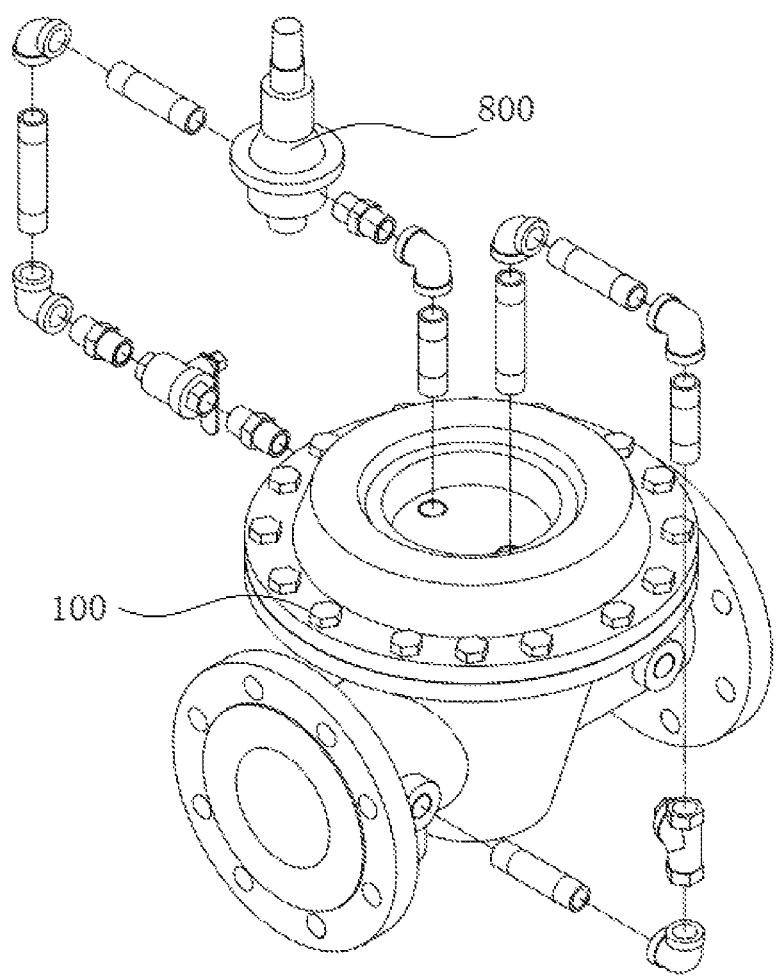
FIG. 15 is a schematic diagram showing pipelines installed in a pressure reducing system in which the straight through diaphragm valve is used, according to an embodiment of the present disclosure.

As shown in FIG. 15, the present embodiment provides another fluid control system, specifically, a water supply system, which includes a pilot valve 800 and the straight through diaphragm valve 100 as described in Embodiment 2. The pilot valve 800 is connected to the straight through diaphragm valve 100 according to the path as shown in FIG. 15. In the water supply system, the straight through diaphragm valve 100 is used as a pressure reducing valve. An outlet pressure is manually set within a working pressure range by manually regulating the pilot valve 800, and a higher pressure in front of the valve can be automatically reduced to the set outlet pressure. No matter how the pressure or flow in front of the valve changes, a relatively stable pressure behind the valve can be maintained, which is applicable to the water supply systems of the residential buildings, the hospitals, the hotels, the shopping malls, the factories, the airports, the casinos, the libraries, the stadiums, the convention and exhibition centers, etc. In general, the temperature in the application environment is not lower than 4° C., and not higher than 70° C.

A working principle of the abovementioned water supply system is as follows.

(1) Generally, when there is a pressure in front of the valve, the straight through diaphragm valve 100 is opened, and the same pressure acts on the control cavity 5 through a pipeline. The pressure of the control cavity 5 is controlled by regulating the pilot valve 800 to realize the change of the outlet pressure of the straight through diaphragm valve 100.

(2) When the system does not have a demand for flow (the pressure behind the valve is a predetermined valve), the pilot valve 800 is closed. The pressure from the lower cavity 62 of the straight through diaphragm valve 100 enters the control cavity 5 through the pipeline, and the diaphragm 4 is in a closed state. When the system has a demand for the flow, the pilot valve 800 senses the pressure drop behind the valve and is opened, the pressure of the control cavity 5 is released through the pilot valve 800, and the diaphragm 4 is reset to open the valve to supply the flow.

(3) When the system has flow; the pilot valve responds to a slight change of the pressure behind the valve, and regulates the pressure of the control cavity 5 to control the opening degree of the valve body, so that the pressure behind the valve is stable continuously. The opening degree of the straight through diaphragm valve 100 changes along with the position of the pilot valve 800. When the pilot valve is closed, the straight through diaphragm valve 100 is also closed. When the pilot valve is opened, the straight through diaphragm valve 100 is also opened.

It can be seen that the straight through diaphragm valve 100 of the present embodiment has a plurality of purposes, is different from the structural forms of the valves on the market, is low in cost, long in service life, and convenient to maintain, and is applicable to an automatic sprinkler system, a water supply system, etc. with high pressure as a main valve structure.

For those skilled in the art, it is obvious that the present disclosure is not limited to the details of the above exemplary embodiments, and can be implemented in other specific forms without departing from the spirit or basic features of the present disclosure. Therefore, from any point of view, the embodiments should be regarded as exemplary but not restrictive. The scope of the present disclosure is limited by the attached claims rather than the above description. Therefore, it is intended to include all changes within the meaning and scope of the equivalent elements of the claims in the present disclosure, and any numeral in the claims shall not be regarded as limiting the claims involved.

In the present disclosure, specific examples are applied to illustrate the principle and implementation mode of the present disclosure. The description of the above embodiment is only used to help understand the method and core idea of the present disclosure. Meanwhile, for those of ordinary skill in the art, there will be changes in the specific implementation mode. In conclusion, the content of the present description shall not be construed as a limitation to the present disclosure.

What is claimed is:
1. A straight through diaphragm valve, comprising:
a straight through valve body, wherein through holes for connecting a first external pipeline are formed in the straight through valve body;

a bonnet, wherein the bonnet is connected to the straight through valve body, and through holes for connecting a second external pipeline are formed in the bonnet;

a diaphragm, wherein the diaphragm is arranged in the straight through valve body, and fixed between the bonnet and the straight through valve body;

a control cavity is formed between the diaphragm and the bonnet, and a fluid cavity is formed between the diaphragm and the straight through valve body; and a guide protrusion, wherein the guide protrusion is formed on an end face of the bonnet, configured for matching with the straight through valve body, to guide opening and closing of the diaphragm, wherein the diaphragm comprises:

a sealing section, wherein the sealing section is configured for sealing the fluid cavity, and a diaphragm skeleton is wrapped in the sealing section so that the sealing section is kept in a fixed shape; and a connecting section, wherein the connecting section is connected to an end of the sealing section, and fixed between the bonnet and the straight through valve body, wherein the diaphragm skeleton is a conical skeleton, so that the sealing section is a conical sealing section; and the connecting section is connected to a large end of the conical sealing section.

2. The straight through diaphragm valve according to claim 1, wherein the diaphragm extends from the sealing section to form the connecting section.

3. The straight through diaphragm valve according to claim 1, wherein through holes communicated with the second external pipeline are formed in the guide protrusion.

4. The straight through diaphragm valve according to claim 1, wherein the guide protrusion is a conical protrusion, and a large end of the conical protrusion is connected to the bonnet.

5. The straight through diaphragm valve according to claim 4, wherein a taper of the conical protrusion is equal to that of the diaphragm skeleton.

6. The straight through diaphragm valve according to claim 1, wherein a conical sealing surface of the valve body is formed in the fluid cavity, so as to seal and fit an outer peripheral surface of the conical sealing section when the diaphragm is reset and closed.

7. The straight through diaphragm valve according to claim 6, wherein a conical concave surface is formed in the fluid cavity, so as to be embedded into a bottom of the conical sealing section to form a sealing pair when the diaphragm is reset and closed.

8. A fluid control system; comprising a straight through diaphragm valve, wherein the straight through diaphragm valve comprises:

a straight through valve body, wherein through holes for connecting a first external pipeline are formed in the straight through valve body;

a bonnet, wherein the bonnet is connected to the straight through valve body, and through holes for connecting a second external pipeline are formed in the bonnet;

a diaphragm, wherein the diaphragm is arranged in the straight through valve body, and fixed between the bonnet and the straight through valve body; a control cavity is formed between the diaphragm and the bonnet, and a fluid cavity is formed between the diaphragm and the straight through valve body; and a guide protrusion, wherein the guide protrusion is formed on an end face, configured for matching with the straight through valve body, of the bonnet, to guide opening and closing of the diaphragm;

wherein the control cavity is connected to the second external pipeline to form a first fluid channel at a bonnet end; the fluid cavity is connected to the first external pipeline to form a second fluid channel at a valve body end; and by regulating and controlling a pressure in the first fluid channel at the bonnet end and a pressure in the second fluid channel in the valve body end, the diaphragm is moved in a direction close to the bonnet along the guide protrusion to open the fluid cavity, or the diaphragm is reset in a direction far away from the bonnet along the guide protrusion to seal the fluid cavity, wherein the diaphragm comprises:

a sealing section, wherein the sealing section is configured for sealing the fluid cavity, and a diaphragm skeleton is wrapped in the sealing section so that the sealing section is kept in a fixed shape; and a connecting section, wherein the connecting section is connected to an end of the sealing section, and fixed between the bonnet and the straight through valve body, wherein the diaphragm skeleton is a conical skeleton, so that the sealing section is a conical sealing section; and the connecting section is connected to a large end of the conical sealing section.

9. The fluid control system according to claim 8, wherein the diaphragm extends from the sealing section to form the connecting section.

10. The fluid control system according to claim 8, wherein through holes communicated with the second external pipeline are formed in the guide protrusion.

11. The fluid control system according to claim 8, wherein the guide protrusion is a conical protrusion, and a large end of the conical protrusion is connected to the bonnet.

12. The fluid control system according to claim 11, wherein a taper of the conical protrusion is equal to that of the diaphragm skeleton.

13. The fluid control system according to claim 8, wherein a conical sealing surface of the valve body is formed in the fluid cavity, so as to seal and fit an outer peripheral surface of the conical sealing section when the diaphragm is reset and closed.

14. The fluid control system according to claim 13, wherein a conical concave surface is formed in the fluid cavity, so as to be embedded into a bottom of the conical sealing section to form a sealing pair when the diaphragm is reset and closed.

* * * * *